United States Patent Office 3,578,535
Patented May 11, 1971

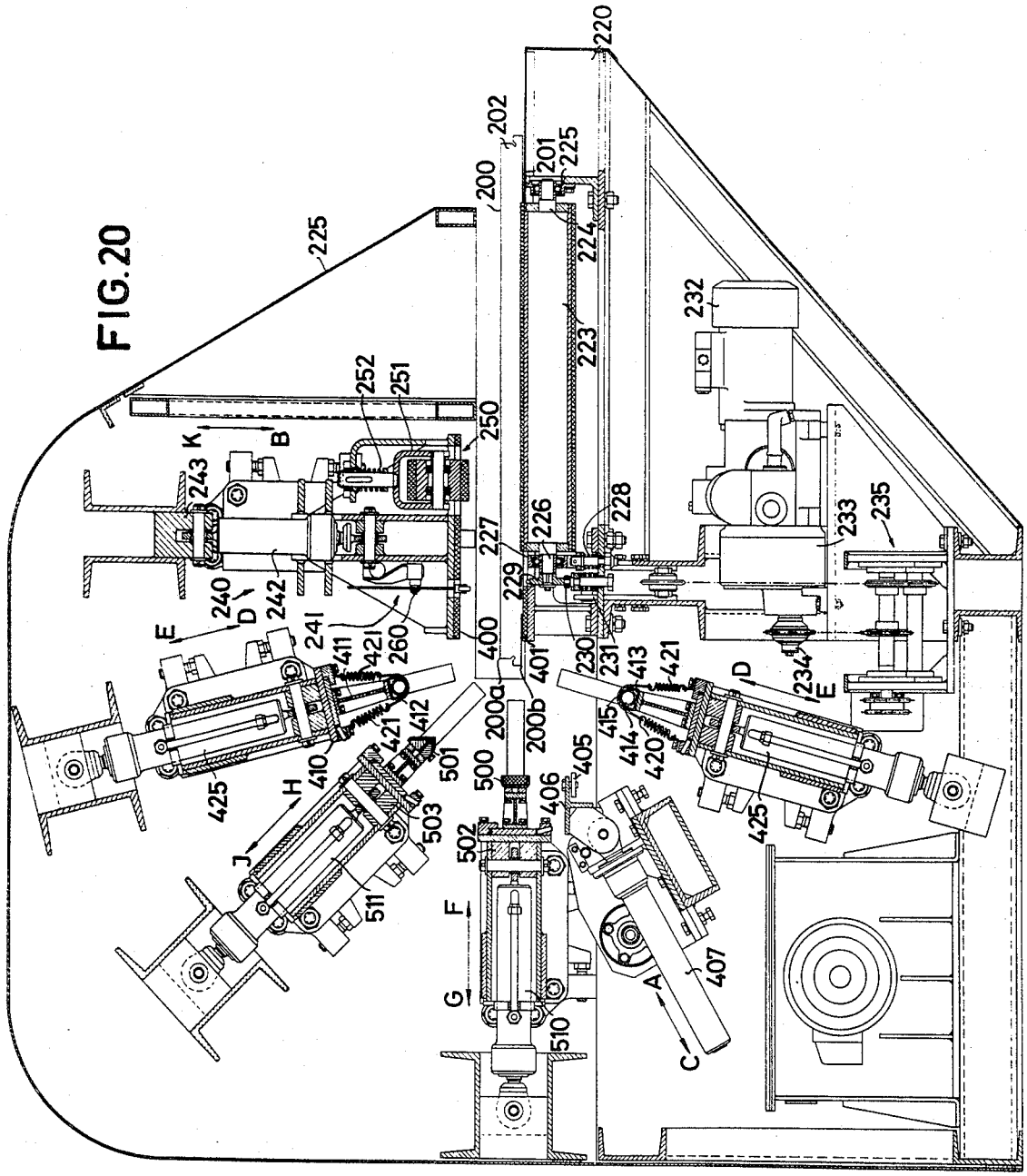

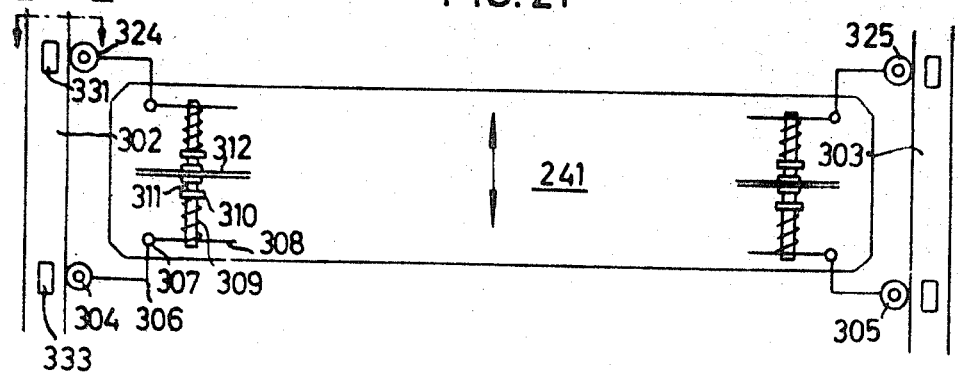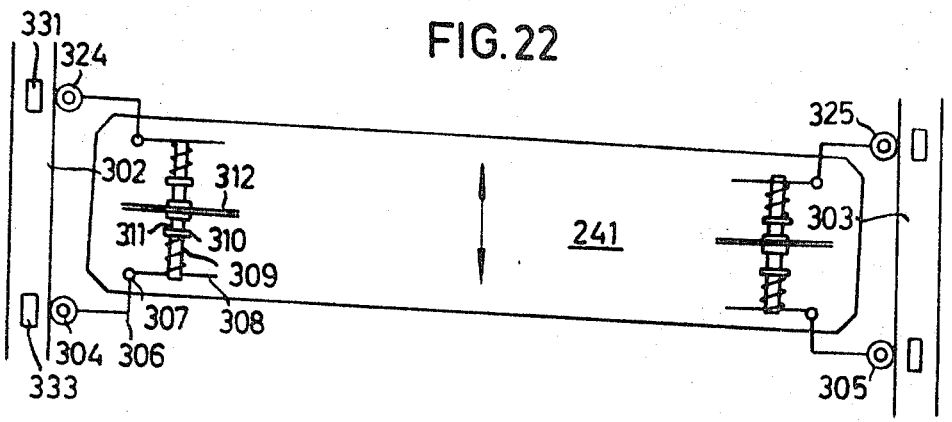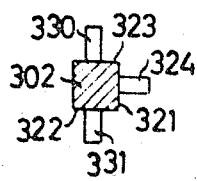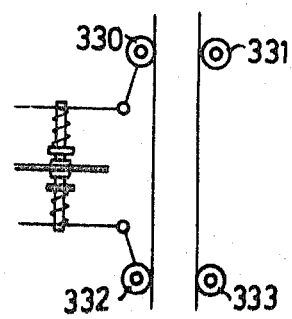

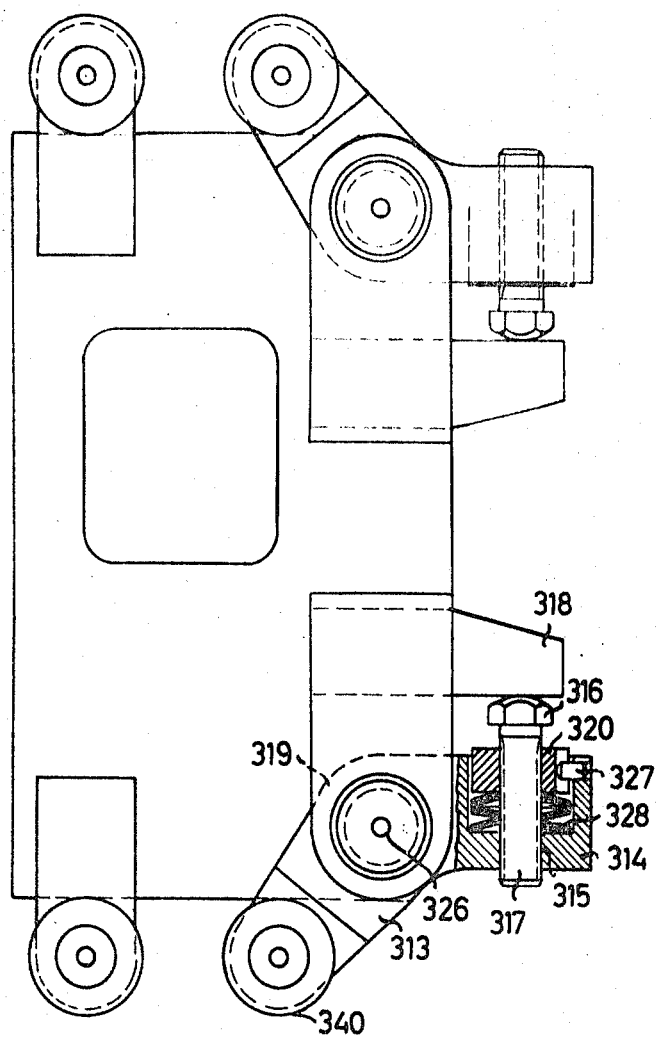

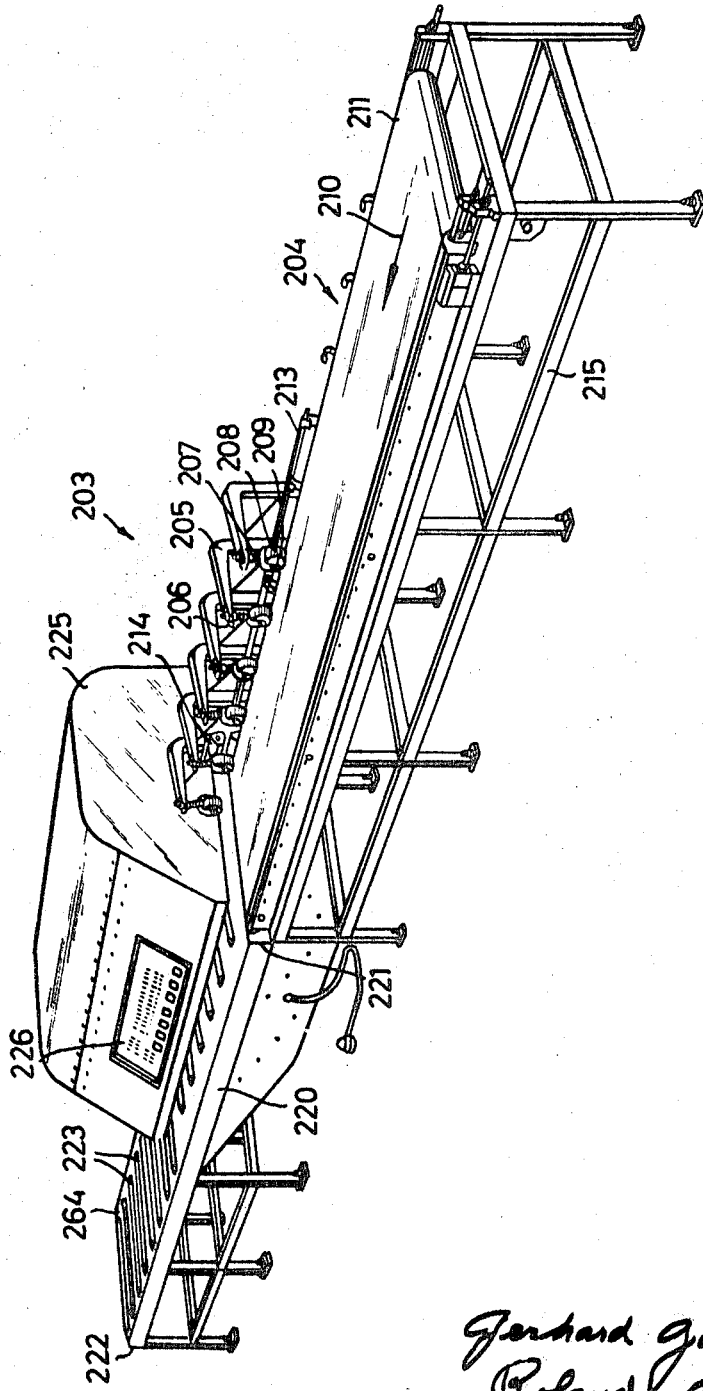

3,578,535
MACHINE FOR FOLDING EDGES OF A PLASTICS SHEET FACING ABOUT A DOOR PANEL, OR THE LIKE
Gerhard Göhlfennen, Imstiege 10, and Roland Spicka, Bahnhofstr. 13, both of Gildehaus, Germany
Filed July 22, 1968, Ser. No. 746,549
Claims priority, application Germany, July 22, 1967, G 50,720; Nov. 7, 1967, P 16 25 549.5; July 3, 1968, P 17 79 066.8
Int. Cl. B65c 9/36; B30b 15/34
U.S. Cl. 156—493
13 Claims

ABSTRACT OF THE DISCLOSURE

A machine for applying plastics sheet material facing to a door panel or the like, in which the door panel is advanced on a table where mechanism operates first to align it, and then other mechanism clamps it firmly in place, bears for the clamping device being guided between parallel guide members. Thereafter, presses in the form of gas-filled flexible tubes apply pressure to the facing material at the corners. Sequentially, tools apply the facing material to other parts of the door, including the rabbeted edge portion. Finally the clamping device is released to enable the finished door panel to make way for an unfinished door panel.

BACKGROUND OF THE INVENTION

The invention relates to a machine for finishing a facing of plastics sheet material on shaped components of wood or wood products, wherein the longitudinal and/or transverse marginal portions of the plastics sheet material are heated and plastified and possibly provided with glue and then wrapped around the cooperating longitudinal or transverse edges of the work, secured to surfaces adjacent said edges of the work and their ends possibly tucked or inserted into slot-like recesses extending parallel to the edges of the work.

Such a machine completes the application of the facing to a component to one major side of which the facing has already been applied, in such a way that the portions which are to cover the remaining surfaces of the component still project beyond the edges. The components in question may be components required in the production of furniture, such as panels for wardrobes and cupboards, as well as components required for carpentry work, such as doors, principally the leaves of double doors. Such components may consist of solid wood or chipboard panels or they may consist of compound materials containing wood. More particularly components of the latter kind may be built up and combined with the facing in a multiple form of construction.

When producing such components it is important that the most complicated part of the manufacturing process, namely that of wrapping the facing sheet around the edges and of securing the same to the surfaces of the component, should be capable of being performed substantially automatically in a machine of the contemplated kind in order to obviate the errors and faults which unavoidably occur when this work is done manually and also in order to reduce the considerable cost which manual work always involves. The machine should be capable of delivering a finished component in which the edges of the facing sheet abut without showing a joint or in which they are secreted in slots designed to receive them. This is required not merely for reasons of appearance when it is required that no part of the component should remain uncovered, but also for practical reasons since a facing that is not cleanly applied, for instance to the leaf of a door, may later tend to detach itself and to peel away from its base.

For this purpose the portion of the sheet material projecting beyond the edges of the component, which are usually square to the principal surfaces, must be wrapped around these edges so that the sheet material forms a minimum radius even if the thickness of the facing sheet material is considerable. This can be done only if the sheet material is first considerably plastified. However, the plastified plastics sheet material must not be subjected to tension or thrust because this would involve changing the longitudinal and lateral dimensions of the original blank beyond or below its design dimensions which are needed for covering the treated component exactly. In other words, the blank would not then fit as required.

SUMMARY OF THE INVENTION

The invention provides a machine which is capable of performing all the operations necessary for folding the projecting portions of sheet material around the edges of the component, in such manner that no skilled personnel is required apart from the machine minder, the proposed machine thus providing the necessary facilities for an at least semiautomatic manufacturing process which can later be developed to fully automatic operation, particularly when the treated components are mass produced articles.

According to the thought which underlies the present invention, this is achieved by the provision of presses which act on the previously heated and possibly glue-coated margins of the plastics sheet projecting beyond the longitudinal and transverse edges of the treated component, and which, having wrapped these around said edges, also apply pressure to the adjacent faces of the component by pressure-applying surfaces constituted by flexible tubes containing a constant and possibly adjustable internal pressure.

These flexible tubes are capable of adapting themselves to the shape of the edges of the component and of the adjoining surfaces by being deformed by the pressure of the press and the pressure maintained inside the tubes. The deformed tubes apply pressure to the surfaces of the plastics sheet material and of the treated component, which acts in a direction normal to said surfaces. Consequently, the design dimensions of the plastics blank will not change, despite its prior plastification.

Preferably the flexible tubes may be filled with gas. Therefore the invention proposes to connect the tubes to a source of compressed air and to provide relief valves adjusted to the required internal pressure of the tube. Each of the tubes may be contained in a suitably shaped retaining member or holder which leaves a portion of the tube surface exposed on the side facing the edge of the component around which the sheet material is to be wrapped. This exposed portion of the tube surface is conveniently covered by a jacket which may be attached to springs pulling the jacket tightly over the retaining member.

When the marginal portion of the plastics sheet which projects from the edge of the component has thus been wrapped around the edge and pressed against the adjoining surface region of the component it must be reliably secured in position. In the proposed machine this is done by presses which come into operation when the tube presses have been withdrawn, and which have rigid pressing surfaces conforming in shape to the cooperating part of the treated component. These shapes may conform for instance with that of a slot provided in the component for the reception therein of the extreme ends of the marginal portions of the sheet material.

Although in principle the proposed machine permits components of any size to be provided with a facing sheet, the components principally needed in carpentry and joinery work are of considerable length. The tools of the machine that have so far been described as well as further operating elements not yet described must therefore be attached to relatively long bearing members adapted to perform principally vertical reciprocating movements, their ends being guided between substantially parallel guide members.

It is essential that the principal edges of the bearer should be adjustable in the plane determined by the guide members and that this adjustment should be capable of being repeated or corrected whenever required, without involving too much time and work. If the bearers are guided on column-shaped guide members which slidably pass through relatively spaced holes in the bearer, then the necessary accuracy of such guide means can only be achieved by the provision of holes simultaneously drilled on large boring mills. Owing to the considerable length of the bearers such boring machines are very expensive. However carefully the holes may have been drilled, adjustment of the bearer is time-consuming and difficult. Furthermore, the columns must be free-standing elements. This is not always a satisfactory arrangement since the columns must be exactly parallel and this is then difficult to ensure.

For overcoming these difficulties the bearers are provided at each of their ends with rollers which roll on the guide members with the application thereto of an adjustable amount of contact pressure.

Increasing the contact pressure of one of the rollers usually involves a change of the pressure applied to their cooperating guide member by one or more of the other rollers on the bearer. When one roller is adjusted to increase its contact pressure and one or more of the others are adjusted to reduce their contact pressure, the entire bearer will tilt. By suitably selecting the rollers that are adjusted the bearer can thus be rapidly and easily set to move in a required working path. Moreover, readjustment is also readily possible in the same way.

To permit adjustment of a bearer about a given axis at least two rollers or groups of rollers at each end of the bearer must be relatively spaced along the length of the guide member, and the contact pressure of each roller or group of rollers must be independently adjustable.

The rollers of the groups of rollers may be arranged to bear against the guide members in at least three different planes. This permits the bearer to be adjusted in three dimensions by tilting the same about three relatively perpendicular axes.

It may be advisable to arrange for the rollers to bear resiliently on the guide members. Their contact pressure can then be controlled by adjusting the spring bias. In such an embodiment of the invention the bearer can yield when temporary overloads should occur, but it will automatically resume its prescribed position. In practice this can be achieved by mounting the rollers in at least two planes of the guide members, individually or in groups, on one of the arms of cranked levers deflectably mounted on the ends of the bearer, whereas the other arms of the levers bear against springs supported by adjustable bearings in the ends of the bearer which permit the spring bias to be controllably varied. The contact pressure of the rollers can thus be adjusted by adjustment of the spring bias.

On the other hand, the precision of the guiding action can be improved if the two-armed roller-mounting lever is fulcrumed at the vertex of the angle formed by the arms, and one or more rollers are mounted at the end of one arm, whereas the other arm has an adjustable stop bearing against a fixed abutment on the end of the bearer.

The bearers which in the proposed machine are thus guided precisely are preferably operated by hydraulic rams. A hydraulic ram is understood to comprise a cylinder slidably containing a piston with a piston rod, the cylinder being preferably of the double-acting type.

In view of the considerable lengths and weights of the components that must be handled, the machine may with advantage be associated with a preceding feeder belt above which are located a plurality of press-down rollers mounted on axles set at an angle to the direction of travel of the conveyor belt in such a manner that the press-down rollers urge the belt against stops in the machine to align the feeding components in relation to the worktable of the machine. This arrangement permits the components that are to be processed in the machine to be placed on the feeder conveyor in any position, the components being automatically conveyed into contact with the stops which align them correctly for delivery into the machine.

Preferably the stops may have the form of rollers which roll on a face of the component that is perpendicular to the plane of the table, and which are mounted on a bearer adapted to be moved into two end positions by a hydraulic ram, the rollers in one end position making contact with the said face of the component, whereas in the other end position they are withdrawn not to obstruct the operation of the presses.

The worktable of the machine may be provided with rollers relatively spaced along the length of the table in such manner that a part of the peripheral surface of each roller projects above the table top but can be depressed below table level by the thrust of hold-down means acting on the component from above.

For this purpose the ends of the rollers facing the presses are mounted in bearings which are yieldingly supported in the direction in which the rollers are depressed, whereas the bearings at the other end of the rollers are self-aligning bearings situated below table level. The rollers may be driven by an endless chain. Conveniently the ends of the rollers facing the presses may have shaft ends which project beyond the resiliently mounted bearings, and which carry gear wheels for engagement of one strand of the endless driving chain.

As soon as the hold-down means in the machine are operated and bear down on the component the latter will depress the rollers below table level and the component will thus be firmly located. When the hold-down pressure is relaxed, the rollers are adapted to raise the component again and to convey it away when the conveyor they form is restarted.

Preferably the hold-down means comprise a bearer which carries a press pad facing the component and which is reciprocably movable by a ram perpendicularly to the plane of the table. This bearer of the hold-down means may carry further guide rollers mounted in resiliently supported roller cages. These guide rollers accept the component from the preceding feeder conveyor and they are automatically inactivated by virtue of their resilient suspension when the clamping means descends.

Preferably the presses, hold-down device and stops of the machine are completely enclosed. However, it is advisable to provide a table which in length exceeds the length of the presses by at least the length of one component, to permit the latter to be conveyed out of the machine when the work has been completed and to be removed from the extended end of the table.

All the assemblies combined in the machine are so disposed that their drive means—rams and driving motors of the conveyors—need merely be appropriately controlled for a satisfactorily completed component to be delivered by the machine. Control may be suitably programmed so that the machine minder need not even worry about the correct sequence of the several control operations. Naturally, in a production line the programme may be triggered by the components themselves as they enter the machine. The result will be a fully automated production stage.

BRIEF DESCRIPTION OF THE DRAWINGS

Embodiments of the invention will be hereinafter described in greater detail by reference to the drawings, in which:

FIG. 20 is a cross section of the machine taken perpendicularly to the longitudinal direction of the projecting margin of plastics sheet material which is wrapped around the edges and applied to the work in the machine;

FIG. 21 is a diagrammatic elevational view of the bearer or mounting for the hold-down device;

FIG. 22 is a view similar to FIG. 21, but showing the bearer or mounting in tilted position;

FIG. 23 is a sectional view substantially on the line III—III of FIG. 21;

FIG. 24 is a diagrammatic fragmentary elevation showing the arrangement of certain rollers with respect to the vertical guide member which they engage;

FIG. 25 is a practical embodiment of the guide means on the bearer, the stationary guide member itself being omitted;

FIG. 26 is a perspective general view of the machine; and

FIG. 1 is a cross section of a component 1 consisting of wood or a wood product. The cross section of the component is rectangular. Three of its sides 2, 3 and 4 are faced with a plastics sheet material which is wrapped around the edges of the remaining side 5 but leaves part of this side exposed. The longitudinal edges 6 and 7 of the plastics sheet material which is generally indicated by reference numeral 8, are each inserted into a slot-shaped recess 9 which runs parallel to the longitudinal edges 6 and 7. The two recesses are identical.

Figure 1:
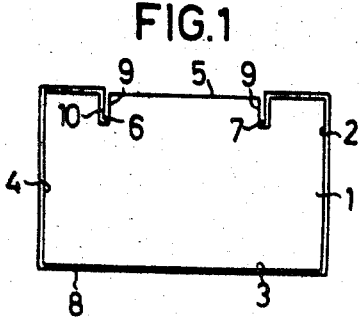
FIG. 1 is a diagrammatic cross sectional view of a rectangular component having a facing of plastics sheet material.

In cross section, as shown in the drawing, the length of each recess is substantially equal to the length of the marginal portion of the edge 6 which is received into the same. In a vertical section normal to the plane of the paper in FIG. 1 the depth of the recess is equal to the width of a marginal portion along the edge 6. In other words, the size of the sheet must exceed the area of the surface of the body 1 it is intended to cover by the width of this marginal portion 6 in the recess 9.

In the embodiment according to FIG. 1 the size of the sheet exceeds the peripheral length of the covered area by exactly twice the width of this marginal portion 10, since the two slot-shaped recesses 6 and 7 are of identical depth.

Figure 2:
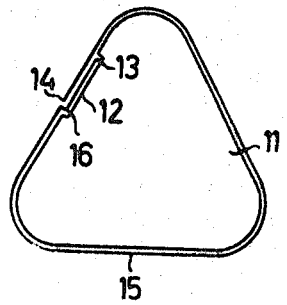
FIG. 2 is a diagrammatic cross sectional view of a triangular component faced with plastics sheet material.

The embodiment in FIG. 2 differs from that in FIG. 1 substantially in that the illustrated component 11 is of triangular section with rounded edges. The depth of the slot-shaped recess 12 is in accordance with the above-described principle, excepting that the two edges 13 and 14 of the plastics sheet 15 and the marginal portion adjacent thereto are both inserted into the same recess 12. For this purpose the width of sheet material extending from the edge at 13 must be kinked to form an offset which is insertable into the recess 12, as indicated at 16.

Figure 3:
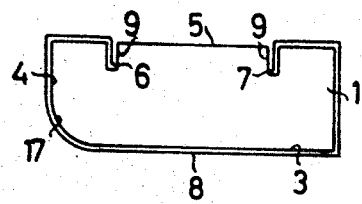
FIG. 3 is a diagrammatic cross sectional view of a generally rectangular component, one of the longitudinal edges being rounded, and faced with plastics sheet material.

The embodiment according to FIG. 3 is again substantially similar to that in FIG. 1 and the same reference numerals are therefore used to identify corresponding parts. The only difference is that one of the longitudinal edges of the shaped body, namely that marked 17, is rounded.

Figure 4:
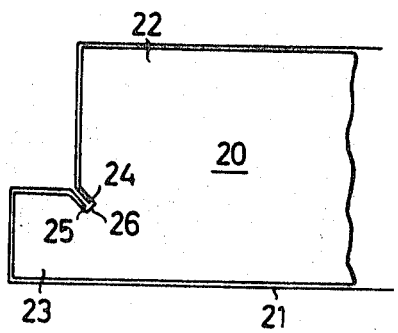
FIG. 4 is a diagrammatic cross sectional fragment of a door panel faced with plastics sheet material.

FIG. 4 is a door panel 20 faced with a plastics sheet material 21. As is conventional, the panel is formed with a projecting fin 23 of reduced section in relation to the main part 22 of the panel to form a rabbet for cooperation with the frame of the door. One edge 24 of the plastics sheet together with the parallel edge 25 on the opposite end of the sheet are both inserted into a recess 26 provided in the angle of the rabbeted part 22 of the door panel, i.e. in the re-entrant angle at the base of the projecting fin 23. The two longitudinal edges 24 and 25 as well as the adjoining marginal portions of the sheet are received into this recess. Consequently the size of the sheet exceeds that required for completely embracing the panel 20 by twice the width of these marginal portions.

Figure 5:
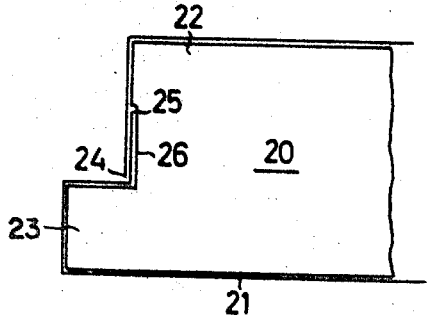
FIG. 5 is a diagrammatic cross sectional fragment of a door panel faced with plastics sheet material with the free edges overlapped similar to that of FIG. 2.

FIG. 5 is a modified arrangement in a door corresponding to that illustrated in FIG. 4 and in which the free edges of the facing sheet are overlapped similar to FIG. 2. Corresponding parts are identified by the same reference numerals.

Figure 6:
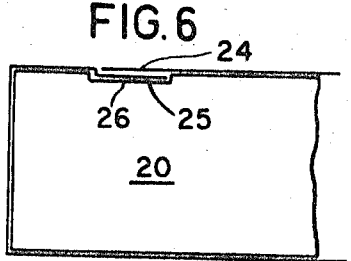
FIG. 6 is a diagrammatic cross sectional fragment of an unrabbeted door panel faced with plastics sheet material.
Figure 7:
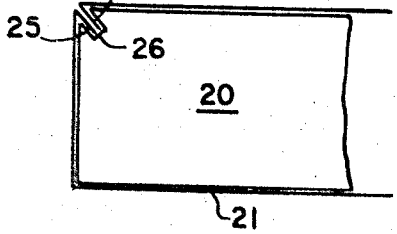
FIG. 7 is a diagrammatic cross sectional fragment of a door panel similar to FIG. 6 in which the free ends of the facing sheet enter a recess at one corner.
Figure 8:
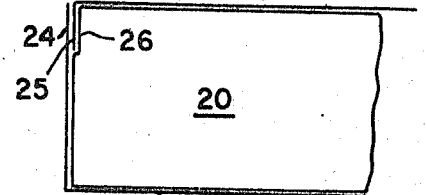
FIG. 8 is a diagrammatic cross sectional fragment of a door panel faced with plastics sheet material, the free ends of which are disposed similar to FIG. 2.

FIGS. 6 to 8 are further embodiments of shaped components which merely differ with respect to the location of the recess for the reception of two longitudinal edges of the sheet material.

The following machine to be explained in greater detail serves for final machining of the previously described shaped components, for example of door panels according to FIG. 4. The final machining consists in completely covering the main surfaces of the door panels 21a and 21b (see FIG. 16) with the sheet material 21, but leaving the area of sheet material to be laid round the surfaces shown at the left in FIG. 4 projecting as projections at the edges 200a and 200b. The sheet material itself is so stiff that the projecting sheet material lies substantially in the plane of the surfaces 21a and 21b.

Figure 9:
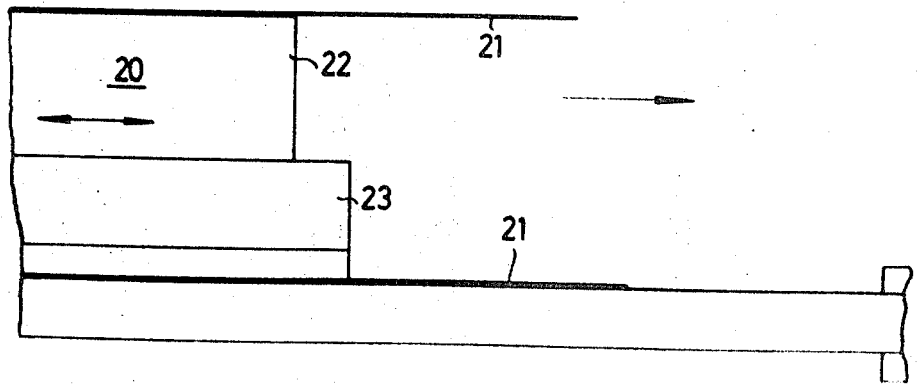
FIG. 9 is a diagrammatic side view showing a rabbeted door having plastics sheet material applied to opposite faces as it is fed to a machine.
Figure 10:
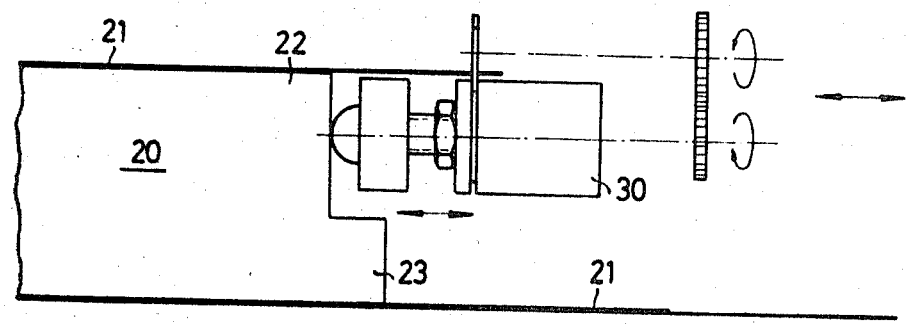
FIG. 10 is a diagrammatic fragmentary view similar to FIG. 9, but showing the manner of cutting off a portion of the facing material.
Figure 11:
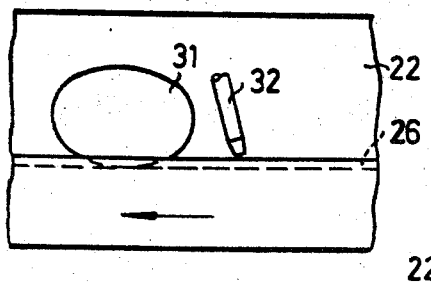
FIG. 11 is a diagrammatic fragmentary side elevation showing a disc cutter cutting a recess in a door panel for reception of the edge portions of the facing material.
Figure 12:
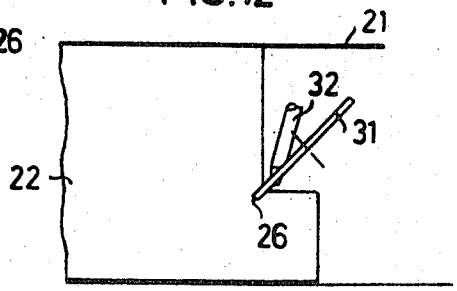
FIG. 12 is a diagrammatic fragmentary end view of the structure shown in FIG. 11.

The apparatus first described hereinafter provides for the door panel 20, as shown in FIG. 9, to be fed into the machine from the left. The sheet material 21 (applied in a press, not shown) is cut off by a blade 30 as shown in FIG. 10. FIGS. 11 and 12 show the formation of the recess 26. As may be seen from the side elevation according to FIG. 11, the recess 26 is formed by a rotating disc cutter 31 which is tilted according to the angle which is included in the recess with the adjacent surface of the reentrant portion of the door panel.

The disc cutter is followed by suction means for clearing sawdust from the recess, the suction tube 32 pointing directly to the recess 26 being shown.

Figure 13:
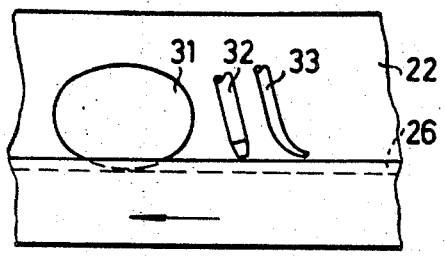
FIG. 13 is a view similar to FIG. 11, but showing additionally a nozzle behind the suction tube for feeding glue to the recess.
Figure 14:
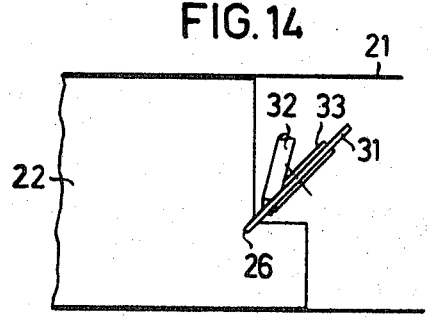
FIG. 14 is a view similar to FIG. 12, but with addition of the glue dispensing nozzle.

After having passed through the devices illustrated in FIGS. 11 and 12, the door will have been provided with the slot-shaped recess 26 extending parallel to the edge of the plastics sheet 21, and all the chips will have been cleaned out of the recess. It is therefore possible to provide, directly behind the suction tube 32, a glue ejector of which the outlet pipe 33 is shown in FIGS. 13 and 14. Glue issues from this pipe 33 and fills the recess 26. It will be understood that one dimension of the recess, namely its third dimension, must be increased by the thickness of the film of glue. A film of sealing compound may also be introduced, but this is not provided for in the embodiment shown in FIGS. 9 to 19.

Figure 15:
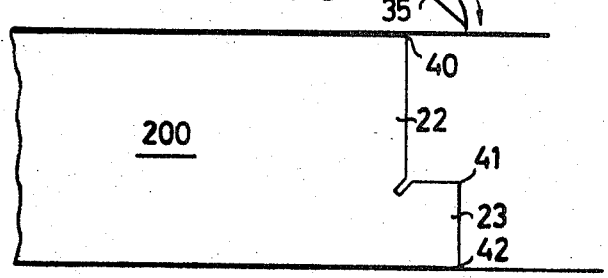
FIG. 15 is a diagrammatic fragmentary end view of a door panel faced with plastics sheet material and showing particularly heaters or radiators.

In FIG. 15 the edges 40, 41 and 42 at the rabbeted portion 22 and the fin portion 23 of the door 200 are heated by radiators 35 and 36 which irradiate adjacent faces of the door. For this purpose the radiators are adjustable in the manner indicated by arrows.

Figure 16:
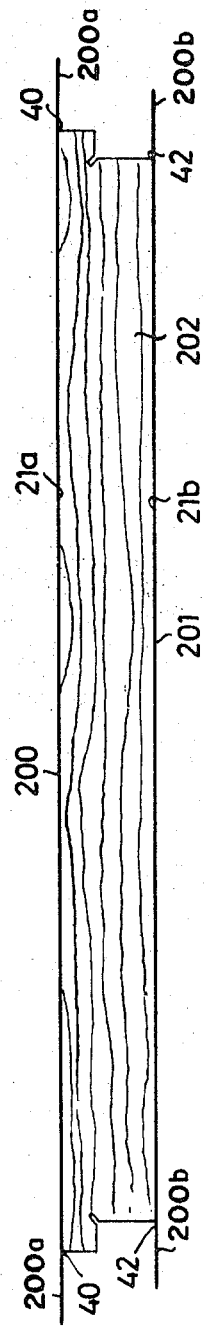
FIG. 16 is a sectional view of a door panel showing the disposition of the plastics sheet facing material after being adhered to opposite sides of the panel.

FIG. 16 shows that when the heating process has been completed, the facing material is applied and glued to the leaf 200 on one side between the edges 40 and on the other side between the edges 42.

Figure 17:
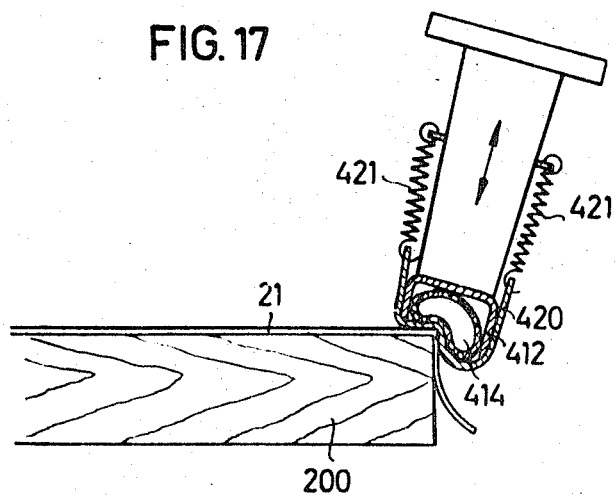
FIG. 17 is a diagrammatic sectional view showing the flexible tube device for pressing the facing material on the corner portions of the door panel.

As shown in FIG. 17 flexible tube presses are now advanced to operate on the corner edges 40 and 42 and their adjoining faces. The pressure-applying surfaces of these presses are constituted by deformable tubes 414 covered by similarly deformable jackets 420 pulled over retaining members 412 by springs 421.

Figure 18:
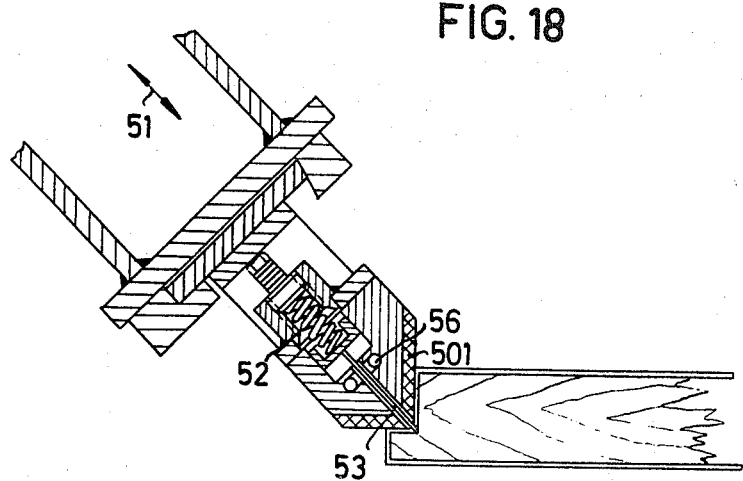
FIG. 18 is a fragmentary sectional view of a device for applying the facing material to the rabbeted portion of a door panel.
Figure 19:
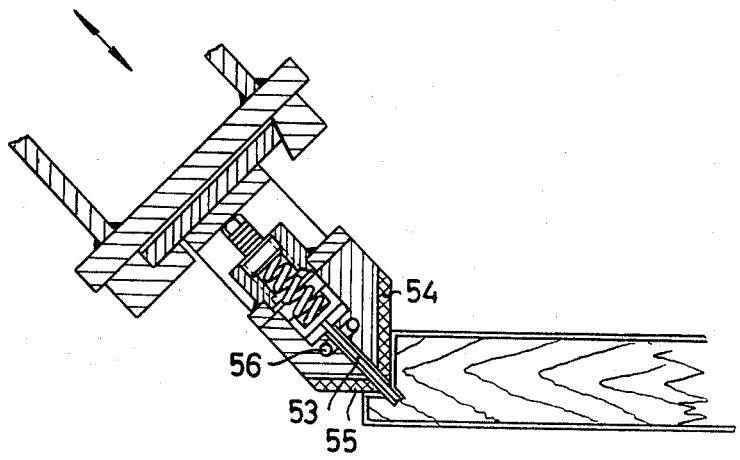
FIG. 19 is a view similar to FIG. 18, but showing the blade in advanced position for positioning the facing material in the recess.

Finally, as illustrated in FIGS. 18 and 19, a heated head 501 is brought into action which in the station illustrated in FIG. 18 is movable in the direction of the arrows 51. This head 501, containing a blade 53 loaded by a spring 52, rubber facings 54 and 55 and heating means 56 push the plastics sheet into the recess and smooth the adjoining surfaces in the manner indicated.

The projecting margins of the sheet material which have been plasticised, as above described and possibly coated with glue, are folded over in a manner which does not change the size of the sheet. This permits the blank to be cut to the exact size required and the machine need merely apply the same to the component.

The principal parts of the machine will be understood by referring to FIG. 26 which is a perspective general view of the machine and FIG. 20 which is a section through the machine.

The component 202 which in this instance is assumed to be a door already provided on its major surfaces 200 and 201 with a plastics sheet facing is first placed on a feeder belt 211 (of a conveyor generally designated 204) which precedes the machine generally indicated by reference numeral 203. The end of the conveyor 204 facing the machine 203 is provided with cantilever holders 205 which at their free projecting ends carry press-down rollers 208 in roller cages 209 biased by springs 207. In the illustrated embodiment, six such press-down rollers are provided. The roller cages 209 are adjustable and so orientated that the roller axes make an angle with the direction of travel 210 of the feeder belt 211. When the door 202 (FIG. 20) is carried under the press-down rollers 208, the latter urge the door against stops which have the form of a rail 213 extending along the side of the feeder belt 211. The rail 213 incidentally carries a gluing device which cannot be seen in FIG. 26 as well as means, indicated at 214, for plasticising the projecting margins of the plastics sheet. These means 214 may have the form of the radiator 35 indicated in FIG. 15.

The feeder belt 211 rests on an underframe 215 and is adapted to travel continuously. In other words, it does not depend upon the control means of the machine 203.

The machine 203 comprises a table 220 which is fitted along its entire length, i.e. from its end 221 adjoining the feeder conveyor 204 to the other end 222, with relatively spaced rollers 223 forming part of a conveyor means yet to be described. As will be understood by reference to FIG. 26, part of the circumference of each roller 223 projects from the top 264 of the table 220.

The roller bed described, permits the door 202 to be conveyed out of the machine to the delivery end of the plant at 222.

The more important components of the machine 203 are illustrated in FIG. 20. A hood 225 which covers the machine carries a control panel 226 on its front face and otherwise serves as a safety shield to prevent accidents.

The rollers 223 are mounted in a particular way. The end 224 of the roller shaft on the right in FIG. 20 runs in a self-aligning ball bearing which permits the roller to pivot about the centre of this bearing. The shaft end 226 on the opposite side is mounted in a radial bearing 227 which is itself housed in a mount supported by a spring 228. Part of the shaft end 226 projects beyond the spring-mounted bearing 227 and carries a sprocket wheel 229 which is fast on the shaft end 226. The sprocket wheel 229 engages a roller link power chain 230 which runs on a resilient guideway 231. The chain is endless, the sprocket wheel 229 cooperating with one of the flights of the chain.

For driving the described conveyor, a motor 232 is located underneath the table 220 and drives the power chain 230 through a gear transmission 233 which transmits the torque from a wheel 234 to the drive 235 of the power chain 230.

Above the table 220 is a hold-down device 240. Substantially this comprises a bearer 241 adapted to be vertically reciprocated by hydraulic rams 242. The rams are mounted on the one hand, in a fixed bearer 243 and, on the other hand, in the movable bearer 241. First the manner in which the movable bearer is mounted will be described, the same principle being adopted in the other working assemblies which make up the machine, and which will be described later.

As shown in FIGS. 21 to 24, the relatively long bearer 241 is guided between two vertical guide members 302 and 303. From the section shown in FIG. 23 of the guide member 302 taken on the line 111—111 in FIG. 21, it will be seen that the guide members in the illustrated embodiment are substantially square columns of identical construction.

Each end of the bearer 241 carries two sets of rollers which are adapted to roll on the surfaces 321, 322 and 323 of the column 302 is three different planes. In the illustrated embodiment the surfaces 322 and 323 are normal to the surface 321. The contact pressure of the rollers in each set cooperating with these surfaces is adjustable. To this end the rollers 324 and 330 of one set cooperating with the two surfaces 321 and 323 are adjustable, whereas the roller 331 of the same set cooperating with the surface 322 is fixed. The adjustable rollers in each set may be identically mounted. Hence the mounting of only one of these rollers will be described, with reference to roller 304 forming one of the adjustable rollers of the lower set shown on the left in FIGS. 21 and 22.

The roller 304 is mounted on a cranked lever 306 pivoted at 307 on the end of the bearer 241. The cranked lever 306 is connected at 307 to an arm 308 which bears against one end of a spring 309.

This spring 309 urges the cranked lever 306 to tilt in the clockwise direction and thus generates the contact pressure of the roller 304 against its cooperating surface 321. Consequently the roller 304 can resiliently yield.

The tension in the spring 309 is adjustable. The end of the spring 309 remote from the arm 308 is supported by an adjustable nut 310 which is rotatably mounted on a screw spindle 311. The spindle is affixed to an abutment 312 which is itself secured to the end of the bearer 241.

In the embodiment according to FIG. 25 a lever 319 carrying a roller 340 is not resiliently yieldable. The roller 340 is mounted on one arm 313 of the lever 319 which has a second arm 314. The lever 319 is fulcrumed at the vertex 326 of the angle between the two arms 313 and 314.

The end of the arm 314 has a tapped hole 315 for the reception of a screw bolt 317 with a hexagonal head 316. The hexagonal head 316 bears against a fixed abutment 318.

A split nut 320 secured by a pin 327 bears against a spring 328. The pin prevents the roller from being accidentally displaced.

In the principal plane of the bearer the latter carries four rollers 304, 305 and 324 and 325 at its end. The rollers 304 and 324 are at one end and the rollers 305 and 325 at the other end. They are relatively spaced and cooperate with their associated guide member 302 and 303 respectively.

For example, the contact pressure of the rollers 304, 305, 325, 324 may be adjusted by the screws and pivoted levers in a manner similar to that described with reference to screw spindle 311. By simultaneously deflecting all the levers and rollers the bearer 241 could be tilted from its position in FIG. 21 into its position in FIG. 22.

In actual fact, and as will be understood from FIGS. 23 and 24, each set of rollers comprises rollers in several planes, i.e. further rollers 330, 331 and 332, 333 are associated with the rollers 304 and 324. Consequently the bearer can be tilted not only about an axis normal to the plane of the paper, as exemplified in the case of the rollers 304, 305 and 324, 325, but it can also be tilted about two further axes.

In the proposed machine, the guide members 302 and 303 may consist for instance of drawn flat steel sections. This is not illustrated in detail in the drawing in FIG. 22. The ends of the bearers carry the rollers in antifriction bearings. Instead of only one roller at each location, several may be provided.

The principal advantage of this bearer and the manner of supporting the same is that irrespectively of the cross-section of the guide member, the necessary adjustments or corrections of the guide means of the bearer for aligning the same can be very easily and quickly made. Moreover, production is inexpensive because no longer are large boring machines required for fabricating them.

The described means for positionally adjusting the bearer also permits imprecision in the spacing of the guide members 302 and 303 and allows misalignment from parallelism to be compensated within a range of several millimetres. Even in such circumstances the bearer can still be moved easily.

In view of these advantages, the described method of mounting the bearer is also applicable generally to machine tools and it is not therefore limited to the present invention.

The hold-down means 240 act on the component 202 from above through an interposed pressure pad 400 which cooperates with a pressure pad 401 located on the top of the table 220 more particularly at the inside edge of the table. When the rams 242 are extended, the pressure pad 400 descends on the face 200 of the component 202 which therefore bears down on the spring-mounted bearing at one end of the conveyor roller and thus depresses the roller circumference in this region below the table surface. In this position the component 202 is firmly located.

However, before the component 202 is thus firmly clamped, it is first aligned on the table 220. This is done by stops in the form of rollers 405 on a bearer 406. This bearer 406 is movable by a ram cylinder 407 between two end positions. The position illustrated in FIG. 20 is the retracted position in which the rollers 405 will not obstruct the other working assemblies of the machine. In the extended position further guide rollers 250 provided on the bearer 241 of the hold-down means 240 guide the leading edge of the component 202 in front of the rollers 405.

These additional guide rollers 250 are mounted in roller cages 251 and are yieldably biased by springs 252. Consequently the rollers 250 can descend below the surface of the pressure pad 400 as soon as the hold-down means 240 exerts pressure. In this position several switches, of which one is shown at 260, are operated and generate a signal for the initiation of the following operations which start after the drive means 232 has been stopped and the bearer 406 has been withdrawn.

First the presses illustrated in FIG. 17 come into operation, since the projecting plastics sheet edges have already been plastified and possibly provided with glue.

A bearer 410 which carries the presses is mounted in the same way as described with reference to the bearer 241. The side of the bearer facing the edge of the component that is to be worked upon, carries an H-section member 411 provided along the length of its outer flange with the shaped retaining member 412. The latter contains the flexible tube 413 in the interior 414 of which a constant air pressure is maintained.

Figure 27:
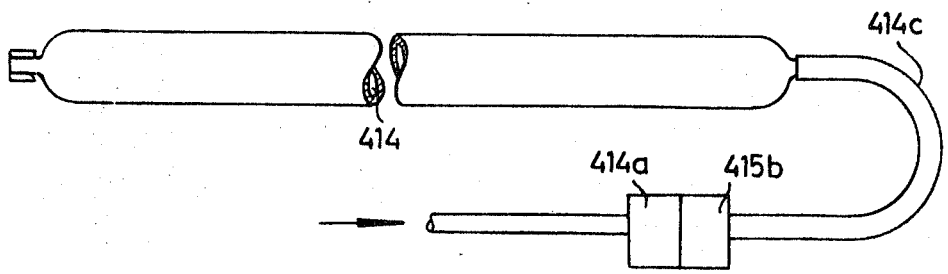
FIG. 27 is a schematic representation of the flexible tube presses.

This can be done by connecting a suitable source of compressed air to the flexible tube 413. A reducing valve 414a (see FIG. 27) and a relief valve 415b adjusted to the internal pressure that is to be maintained are built into an admission pipe 414c to the interior 414 of the flexible tube.

The retaining member 412 is so contrived that it leaves one portion of the surface of the flexible tube exposed. This surface 415 faces the edge of the work around which the plastics sheet is to be wrapped.

In the embodiment according to FIG. 20, two tube presses of the above-described kind are provided. They are of identical construction and like reference numerals therefore identify like parts. The upper compressed-air-tube press in FIG. 20 cooperates with the edge 42, whereas the lower press in FIG. 20 cooperates with the edge 41 of the component 202, these edges being indicated on FIG. 16.

The exposed surface 415 of each air-filled tube is surrounded by the deformable jacket 420 and covered thereby. The jacket 420 is anchored to the bearer 410 by the springs 421 which pull the jacket over the associated retaining member 412 of FIG. 17.

After the flexible tubes, as schematically indicated in FIG. 17 have been pushed into operation by their associated rams 425, the latter are controlled to withdraw and the presses are therefore retracted into the positions shown in FIG. 20. Assemblies 500 and 501 are consecutively brought into operation. These apply the plastics sheet, which may have been previously heated to the remaining surfaces of the component 202, and fix the same in position. These tools are likewise attached to bearers 502 and 503 which are mounted in the same way as the bearers 410 and 241 as illustrated in FIGS. 21 to 25. Moreover, in the same way as the tools that have already been described, rams 510 and 511 are provided for their actuation.

The assemblies 500 and 501 therefore take effect when the air tube presses have been withdrawn, but their pressing surfaces are rigid and possibly shaped to conform to cooperating parts of the work, as will be understood for instance by reference to the assembly 501 in the embodiment shown in FIG. 20.

The sequence in which the several assemblies perform operations on the door is indicated by the lettering on the two-headed arrows placed alongside the rams. The letters A–K indicate the alphabetical sequence in which the tools perform the indicated movement. So far as may be required the time of application of a tool is adjustable.

It will be understood thatt he invention is not limited to the above described and illustrated embodiments. Many modifications could be devised within the scope of the ensuing claims.

What we claim is:

1. A machine for finishing the application of a facing of plastics sheet material to a shaped component of wood or a wood product, wherein the longitudinal and/or transverse marginal portions of the plastics sheet material are heated and plastified as well as possibly provided with glue and then wrapped around the cooperating longitudinal or transverse edge of the component, secured to surfaces adjacent said edges of the component and their edges possibly tucked or inserted into slot-like recesses extending parallel to the edges of the component, characterized by the provision of presses which act on the previously heated and possibly glue-coated margins of the plastics sheet projecting beyond the longitudinal or transverse edges of the component and which, after having wrapped these around said edges, also apply pressure to the adjoining faces of the component by virtue of the pressure-applying surfaces being formed by flexible tubes containing a constant and possibly adjustable internal pressure, a substantially inverted U-shaped rigid retaining member for each flexible tube leaving a portion thereof exposed, a deformable jacket enclosing the exposed portion of each tube, and resilient means for holding each jacket against its retaining member.

2. A machine according to claim 1, characterized in that for smoothing the plastics sheet that has been wrapped around the edges by the tube presses, and for further securing the same, additional presses are provided which operate when the tube presses have been retracted, and which have rigid pressure-applying surfaces, adapted in shape to that of a specific part of the component, and also possibly containing elastic blades for inserting the end of the plastics sheet into the slot-like recess.

3. A machine according to claim 1, characterized by bearers at least for supporting the presses, said bearers being guided between substantially parallel guide members and having sets of rollers at each end which roll on said guide members, and means for adjusting the contact pressure of said rollers.

4. A machine according to claim 3, characterized in that the rollers in the sets of rollers cooperate with the associated guide member in at least three different planes.

5. A machine according to claim 3, characterized in that the rollers working in at least two planes of the guide member are mounted individually or in sets on an arm of deflectably pivoted cranked levels of which the other arms bear against springs supported by adjustable bearings in the ends of the bearer to permit the spring tension to be controllably varied.

6. A machine according to claim 5, characterized in that each roller-mounting lever has two arms and is fulcrumed at the vertex of the angle formed by the arms, and in that one or more rollers are mounted on the end of one arm, whereas the other arm has an adjustable stop bearing against a fixed abutment on the end of the bearer.

7. A machine according to claim 1, characterized by the provision of a preceding belt feeder conveyor above which are located a plurality of press-down rollers mounted on axles set at an angle to the direction of travel of the conveyor, in such manner that said press-down rollers urge the belt against stops in the machine to align the feeding work in relation to a fixed working table of the machine.

8. A machine according to claim 7, characterized in that the stops are rollers which roll on a surface of the work that is normal to the plane of the table, said rollers being mounted on a bearer reciprocable by a hydraulic ram into two end positions of which one brings said rollers into contact with the cooperating surface of the work, whereas in the other end position the rollers are withdrawn not to obstruct the working of the other presses.

9. A machine according to claim 1, characterized in that a working table is provided with conveyor rollers spaced along the length of the table in such manner that part of the periphery of the rollers projects from the top of the table but can be depressed below table level by the thrust of a hold-down means acting from above.

10. A machine according to claim 9, characterized in that the end of the rollers facing the presses are mounted in bearings which are yieldingly supported in the direction in which the rollers are depressed, whereas the bearings at the other end of the rollers are self-aligning bearings below table level.

11. A machine according to claim 9, characterized in that the end of the rollers facing the presses have shaft ends which project beyond the resiliently mounted bearings and carry gear wheels for engagement of one flight of an endless driving chain.

12. A machine according to claim 1, in which the component is a rabbeted door panel, comprising a press having a pair of faces at right angles to each other, and an elastic facing on each face.

13. A machine according to claim 1, characterized in that a hold-down means comprising a bearer which carries a press pad facing the work is provided, the press pad being reciprocably mounted to the plane of the working table, the bearer of the hold-down means being provided with supplementary leading rollers on deflectable axles in resiliently supported roller cages.

References Cited

UNITED STATES PATENTS

| | | | |
|---|---|---|---|
| 2,646,105 | 7/1953 | Langer | 156—580X |
| 3,146,150 | 8/1964 | Goldstone | 156—488X |
| 3,147,172 | 9/1964 | Wesa et al. | 156—480X |
| 3,444,029 | 5/1969 | Renaud et al. | 156—583X |

BENJAMIN A. BORCHELT, Primary Examiner

J. J. DEVITT, Assistant Examiner

U.S. Cl. X.R.

156—583